(12) United States Patent
Ikeda et al.

(10) Patent No.: US 7,445,868 B2
(45) Date of Patent: Nov. 4, 2008

(54) BATTERY PACKS

(75) Inventors: Yoshito Ikeda, Tochigi (JP); Hironobu Moriyama, Tochigi (JP); Yasuhiro Fujita, Tochigi (JP)

(73) Assignees: Sony Chemical & Information Device Corporation, Tokyo (JP); Sony Corporation, Tokyo (JP)

( * ) Notice: Subject to any disclaimer, the term of this patent is extended or adjusted under 35 U.S.C. 154(b) by 0 days.

(21) Appl. No.: 11/776,933

(22) Filed: Jul. 12, 2007

(65) Prior Publication Data

US 2007/0292723 A1 Dec. 20, 2007

Related U.S. Application Data

(63) Continuation of application No. PCT/JP2006/30061, filed on Jan. 13, 2006.

(30) Foreign Application Priority Data

Jan. 14, 2005 (JP) ............................ 2005-007230

(51) Int. Cl.
*H01M 2/10* (2006.01)

(52) U.S. Cl. .................... 429/99; 429/149; 429/163

(58) Field of Classification Search .................. 429/7, 429/96–99
See application file for complete search history.

(56) References Cited

FOREIGN PATENT DOCUMENTS

| JP | 2001-351588 | 12/2001 |
|----|-------------|---------|
| JP | 2002-118372 | 4/2002 |
| JP | 2004-355997 | 12/2004 |

OTHER PUBLICATIONS

IPDL machine translation of JP 2001-351588.*

* cited by examiner

*Primary Examiner*—Susy Tsang-Foster
*Assistant Examiner*—Maria J Laios
(74) *Attorney, Agent, or Firm*—Bell, Boyd & Lloyd LLP

(57) ABSTRACT

In a battery pack including a battery case containing therein a battery cell, a wiring circuit board, and a liquid-absorbing element capable of absorbing the electrolyte leaking out from the battery cell, the liquid-absorbing element is inserted with looseness allowing for expansion in a gap formed by a retaining element on the inner wall surface of the battery case or retaining element on the wiring circuit board. Alternatively, a liquid-absorbing element consisting of a non-absorbent porous retaining element partially holding a liquid absorbent is used and the porous retaining element is fixed to the inner wall surface of the battery case or the wiring circuit board at an absorbent-free zone.

8 Claims, 7 Drawing Sheets

(Sectional view along x-x line)

(Sectional view along x-x line)

(Sectional view along x-x line)

(Sectional view along x-x line)

(Sectional view along x-x line)

(Sectional view along x-x line)

BATTERY PACKS

CROSS REFERENCE TO RELATED APPLICATIONS

This is a Continuation of International Application No. PCT/JP2006/300361 filed Jan. 13, 2006 and claims priority to Japanese Patent Application No. 2005-7230 filed on Jan. 14, 2005. The entire disclosure of the prior applications are incorporated by reference herein in entirety.

BACKGROUND

The present application relates to battery packs comprising a battery cell contained in a case.

Battery packs including a battery case containing therein a primary battery or a secondary battery and a wiring circuit board have been conventionally used. If the electrolyte leaks out from a battery cell in such battery packs, wrong connection may occur by corrosion of the wire of the wiring circuit board or reversely, a short circuit may occur. Thus, it was proposed to place a liquid-absorbing element capable of absorbing electrolytes at a position in contact with or in proximity to the battery in the battery packs in order to avoid the problem of corrosion or short-circuit even if the electrolyte leaks out (e.g., see Japanese Patent Application No. 2001-351588). Such liquid-absorbing elements include nonwoven fabrics, liquid-absorbing resins, porous plastics, nonwoven fabrics or porous plastics held with a liquid-absorbing resin, and the like, and these are placed to fill gaps between battery cells in the battery case or bonded to the wiring circuit board excluding the circuit zone or the wall surface of the battery case by using an adhesive or the adhesiveness of the liquid-absorbing elements per se.

However, if such a liquid-absorbing element is placed to fill gaps between battery cells, the liquid-absorbing element must also be removed and inserted again when the battery cells are replaced. If the liquid-absorbing element is bonded to the wall surface of the battery case or the substrate with an adhesive or the adhesiveness of the liquid-absorbing element per se, the swelling force acts as a peel force on the bonded surface of the liquid-absorbing element to the wall surface of the case or the board when the liquid-absorbing element has been swollen by absorbing the electrolyte. As a result, the liquid-absorbing element might be displaced from the wall surface of the battery case or an intended location on the board and move to an undesirable position such as the circuit zone.

A previous approach to this problem was to block the displacement of the liquid-absorbing element by a partition or the like, but caused a design constraint.

SUMMARY

According to an embodiment, the subject matter of the present application aims to provide a battery pack containing a liquid-absorbing element wherein the liquid-absorbing element remains at an intended location even after the liquid-absorbing element has been swollen by absorbing the electrolyte.

The inventors found that even if a liquid-absorbing element has been swollen by the electrolyte leaking out from a battery cell, the liquid-absorbing element remains at an intended location without moving to an undesirable position such as the circuit zone by inserting the liquid-absorbing element with a looseness allowing for expansion in a gap formed of retaining member on an attaching part in a battery case, or using a liquid absorbing element made of non-absorbent porous retaining element partially holding a liquid absorbent rather than directly bonding the liquid-absorbing element to the wall surface of the battery case. The liquid absorbing element is fixed to the attaching part of the battery case at a position of an absorbent-free part of the porous retaining element.

Accordingly, a first aspect provides a battery pack including a battery case containing therein a battery cell, a wiring circuit board, and a liquid-absorbing element capable of absorbing the electrolyte leaking out from the battery cell, the battery pack further includes a retaining element made of a material incapable of absorbing the electrolyte for retaining the liquid-absorbing element; and the liquid-absorbing element is inserted with looseness allowing for expansion in a gap formed by the retaining element on an attaching part in the battery case.

A second aspect provides a battery pack comprising a battery case containing therein a battery cell, a wiring circuit board, and a liquid-absorbing element capable of absorbing the electrolyte leaking out from the battery cell, wherein the liquid-absorbing element includes a liquid absorbent part having a porous retaining element incapable of absorbing the electrolyte and a liquid absorbent held by a part of the porous retaining element, while the porous retaining element is fixed to an attaching part in the battery case at a part free from the liquid absorbent.

In the battery packs that include battery case containing an electrolyte-absorbing element therein according to an embodiment, wrong connection or short-circuit due to electrolyte leakage can be prevented by absorbing the electrolyte by the liquid-absorbing element if the electrolyte leaks out from a battery cell.

According to the first aspect, the liquid-absorbing element is inserted with looseness allowing for expansion in a gap formed by a retaining element on an attaching part consisting of the inner wall of the battery case or the wiring circuit board. Thus, the liquid-absorbing element need not be directly bonded with an adhesive to a position such as, the inner wall of the battery case or an intended location on the wiring circuit board, thereby solving the problem that the bonded surface of the liquid-absorbing element may be detached from the inner wall of the battery case or the wiring circuit board when the liquid-absorbing element has been swollen by absorbing the electrolyte, and in the result, the result that the liquid-absorbing element is stably retained at an intended location and the safety of the wiring circuit board is improved.

According to the second aspect, the liquid-absorbing element includes a liquid absorbent part formed of a non-absorbent porous retaining element partially holding a liquid absorbent and the porous retaining element is fixed to an attaching part in the battery case consisting of the inner wall of the battery case or the wiring circuit board at a part free from the liquid absorbent. Thus, the porous retaining element at the part free from the liquid absorbent does not expand and cannot be detached at that part even if the liquid absorbent has been swollen by absorbing the electrolyte. Therefore, the problem of the displacement of the liquid-absorbing element from an intended position by swelling of the liquid-absorbing element can be overcome, thereby improving the safety of the wiring circuit board.

Additional features and advantages are described herein, and will be apparent from, the following Detailed Description and the figures.

DETAILED DESCRIPTION

Figure 1A:
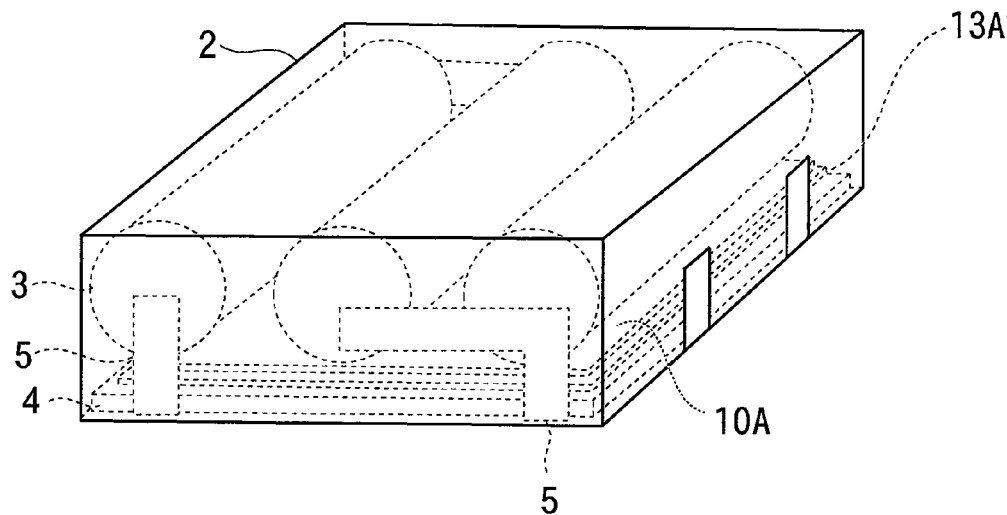
FIG. 1A is a perspective view of a battery pack.

With reference to the accompanying drawings, the subject matter of the present application is explained in detail below according to various embodiments. It should be noted that the same reference numerals are used in the drawings to denote identical or equivalent elements.

Figure 1B:
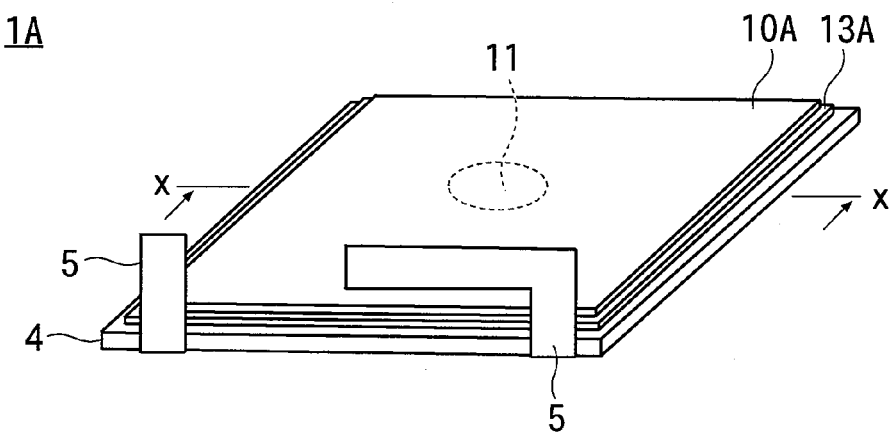
FIG. 1B is a perspective view of the battery pack in the vicinity of the wiring circuit board.
Figure 1C:
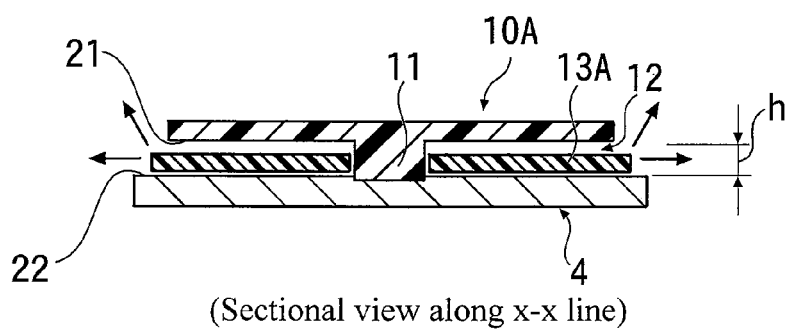
FIG. 1C is a sectional view along x-x line of the battery pack in the vicinity of the wiring circuit board.

FIG. 1A is a perspective view of a battery pack 1A according to an embodiment of the first aspect, FIG. 1B is a perspective view of the battery pack in the vicinity of the wiring circuit board from which the battery case and the battery cells have been removed, and FIG. 1C is a sectional view along x-x line in FIG. 1B in the vicinity of the wiring circuit board.

This battery pack 1A includes a battery case 2 made from an insulating resin such as a polycarbonate resin or acrylonitrile-butadiene-styrene resin (ABS resin) containing therein battery cells 3 including primary batteries such as alkaline batteries or secondary batteries such as lithium batteries or lithium ion batteries and a wiring circuit board 4. Leads 5 connecting the circuit of the wiring circuit board 4 and the electrode terminals of the battery cells 3 rise from the wiring circuit board 4.

An approximately plate-like or sheet-like retaining element 10A made from a material incapable of absorbing electrolytes, e.g., a liquid-permeable material such as a mesh or nonwoven fabric formed from polyethylene, polypropylene, polyimide, polyamide, polyethylene terephthalate or the like is provided on the wiring circuit board 4. This retaining element 10A has a dimension approximately equal to that of the wiring circuit board 4 and includes a support 11 projecting at the center, and the retaining element 10A is fixed to the wiring circuit board (attaching part) 4 via this support 11. It should be noted that the fixation of the support 11 of the retaining element 10A and the wiring circuit board 4 is accomplished by fitting, bonding with an adhesive or the like, and may be detachable.

By fixing the retaining element 10A to the wiring circuit board 4, a gap 12 is formed between the back surface 21 of the retaining element 10A facing the wiring circuit board 4 and the top surface 22 of the wiring circuit board 4. A liquid-absorbing element 13A having a dimension approximately equal to that of the retaining element 10 is loosely inserted in the gap 12.

The height h of the gap 12 (e.g., the distance between the back surface 21 of the retaining element 10A and the top surface 22 of the wiring circuit board 4) is not specifically limited, but normally it is preferably 0.7 to 1 mm when the battery pack 1A has a size of about 20 mm, for example.

As used herein, the expression "loosely inserted" means that the liquid-absorbing element 13A is loosely inserted with looseness in the gap 12.

The liquid-absorbing element 13A can be a nonwoven fabric made from a fiber capable of absorbing electrolytes, a porous plastic, a liquid-absorbing resin, a nonwoven fabric or porous plastic carrying (e.g., held with) a liquid absorbent, and especially the nonwoven fabric or porous plastic carrying a liquid absorbent preferably carries the liquid absorbent throughout the nonwoven fabric or porous plastic.

Liquid absorbents that can be used here include various polymer materials such as adsorptive polymers, gelling polymers and self-swelling polymers. More specifically, they include water-absorbent resins such as, series of polyacrylate resins, starch-graft copolymers, polyacrylamide resins and isobutylene-maleic acid series resins; and oil-absorbent resins such as crosslinked long-chain alkyl acrylate polymers and polynorbornenes; especially polymers capable of sufficiently absorbing nonaqueous solvents used in lithium ion batteries such as propylene carbonate or dimethyl carbonate. Such polymers include those obtained by UV-induced polymerization of a monomer component such as benzil acrylate, N-vinyl-2-pyrrolidone, imide acrylate, acryloyl morpholine, phenoxy ethyl acrylate, N,N-diethyl acrylamide, methoxy polyethylene glycol acrylate, tetrahydrofurfuryl acrylate or phenoxy polyethylene glycol acrylate and a polyfunctional monomer component serving as a crosslinker (e.g., neopentyl glycol hydroxypivalate diacrylate, polyethylene glycol diacrylate (the number of moles of ethylene oxide added (n)=14), bisphenol A diacrylate, phenyl glycidyl ether acrylate, hexamethylene diisocyanate urethane prepolymer, and the like).

The liquid-absorbing element 13A is preferably in the form of a sheet or a plate hollowed at a part corresponding to the support 11 of the retaining element 10A so that the location of the liquid-absorbing element 13A can be restricted by inserting the support 11 of the retaining element 10A into the hollow to fix the retaining element 10A to the wiring circuit board 4.

When the liquid-absorbing element 13A is placed in this manner, the liquid-absorbing element 13A swells in the direction shown by the arrows in FIG. 1C (outward approximately along the plane of the sheet) and the swelling force of the liquid-absorbing element 13A does not act as a peel force on the fixed part of the retaining element 10A and the location of the liquid-absorbing element 13A does not significantly get out of position, even if the electrolyte leaks out from a battery cell 3 and the liquid-absorbing element 13A absorbs it during the use of the battery pack 1A. Thus, the liquid-absorbing element 13A swollen by liquid absorption can be prevented from moving to an undesirable position between the battery case 2.

It should be noted that the liquid-absorbing element 13A may be bonded to the retaining element 10A with an adhesive or the adhesiveness of the liquid-absorbing element 13A per se if desired, so far as it is loosely inserted in the gap 12 between the retaining element 10A and the wiring circuit board 4 as described above.

Figure 2A:
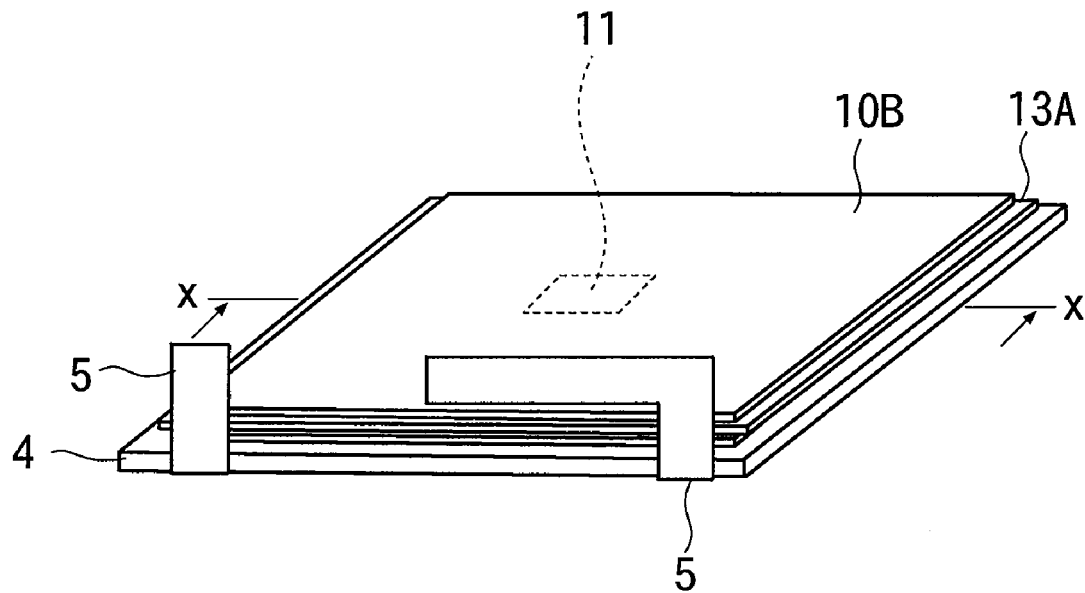
FIG. 2A is a perspective view of a battery pack in the vicinity of the wiring circuit board.

The battery packs can include various embodiments. For example, FIG. 2A is a perspective view of a battery pack 1B according to another embodiment in the vicinity of the wiring circuit board, and FIG. 2B is a sectional view along x-x line in FIG. 2B.

This battery pack 1B uses a retaining element 10B having a flat H-shaped section consisting of two facing plates joined by a support 11 at the center of the plates and a rectangular sheet-like or plate-like liquid-absorbing element 13A is placed in a gap 12 between the upper and lower plates of the retaining element 10B. This retaining element 10B has such a dimension that it can be exactly mounted on a wiring circuit board 4 in the battery pack 1B, and the retaining element 10B and the wiring circuit board 4 are not fixed together though they may be fixed with an adhesive or the like, if desired.

Figure 2B:
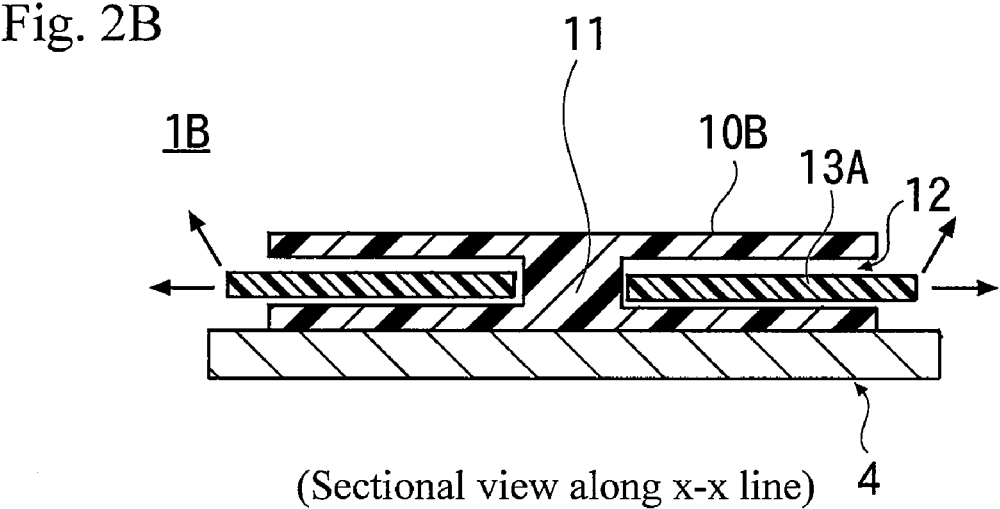
FIG. 2B is a sectional view along x-x line of the battery pack in the vicinity of the wiring circuit board.

When the electrolyte leaks out from a battery cell and the liquid-absorbing element 13A absorbs it during the use of this battery pack 1B, the liquid-absorbing element 13A also swells outward approximately along the plane of the sheet as shown in the arrows in FIG. 2B, but the location of the liquid-absorbing element 13A does not get out of position significantly. Thus, the liquid-absorbing element 13A swollen by liquid absorption can be prevented from moving to an undesirable position with respect to the battery cells 3.

Figure 3A:
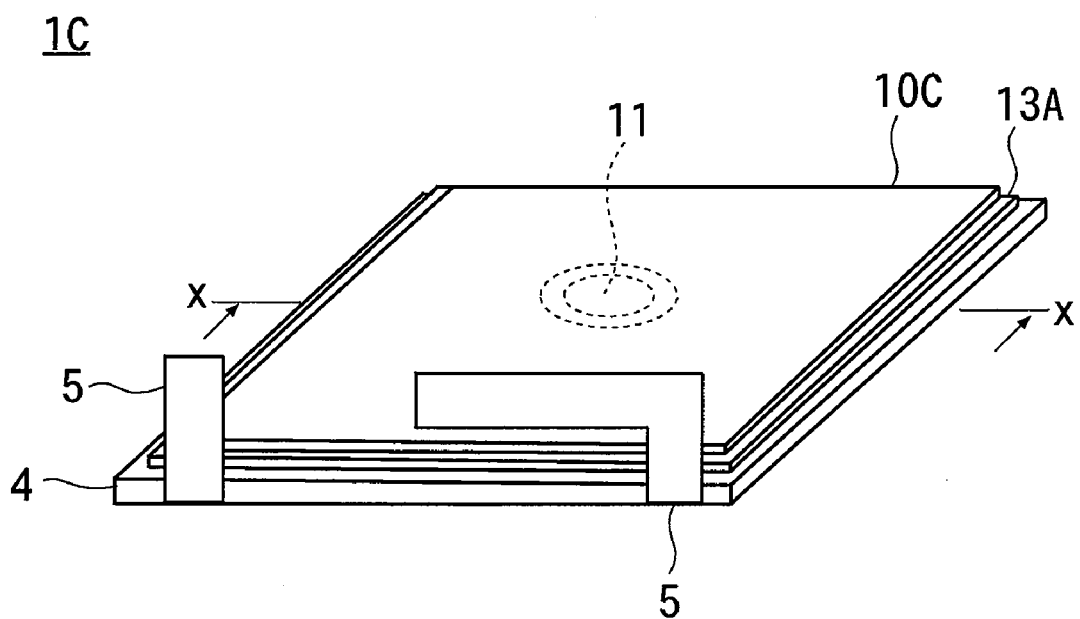
FIG. 3A is a perspective view of a battery pack in the vicinity of the wiring circuit board.
Figure 3B:
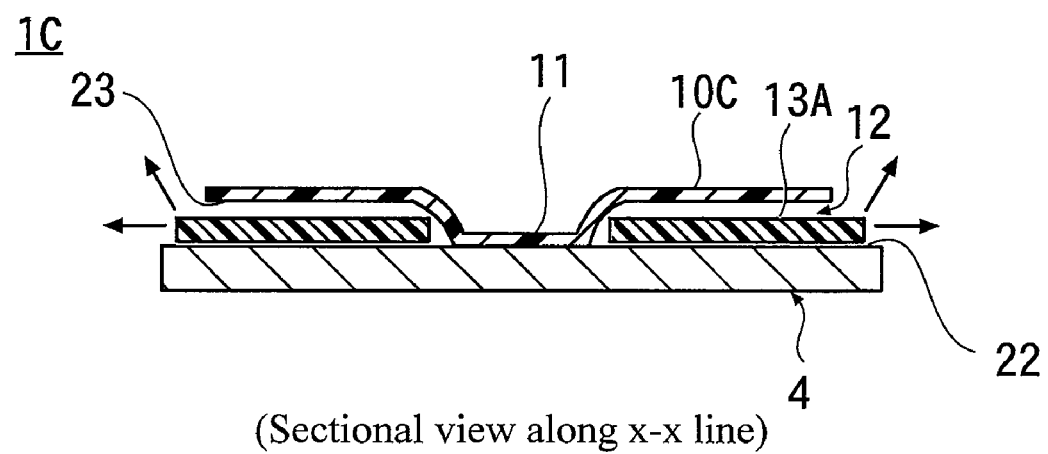
FIG. 3B is a sectional view along x-x line of the battery pack in the vicinity of the wiring circuit board.

FIG. 3A also shows a perspective view of a battery pack 1C according to an embodiment in the vicinity of the wiring circuit board, and FIG. 3B is a sectional view along x-x line in FIG. 3A.

This battery pack 1C uses a retaining element 10C consisting of a sheet-like element made from a material incapable of absorbing electrolytes and its center support 11 is adhered to a wiring circuit board 4 with an adhesive. A liquid-absorbing element 13A is in the form of a plate or sheet hollowed at a part corresponding to the support 11 of the retaining element 10C and loosely held in a gap 12 between the back surface 23 facing the wiring circuit board 4 and the top surface 22 of the wiring circuit board 4 in such a manner that the periphery of the support 11 of the retaining element 10C somewhat floats.

When the electrolyte leaks out from a battery cell and the liquid-absorbing element 13A absorbs it during the use of this battery pack 1C, the liquid-absorbing element 13A also swells outward approximately along the plane of the sheet as shown in the arrows in FIG. 3B, but the location of the liquid-absorbing element 13A does not significantly vary. Thus, the liquid-absorbing element 13A swollen by liquid absorption can be prevented from moving to an undesirable position in the battery case 2.

Figure 4A:
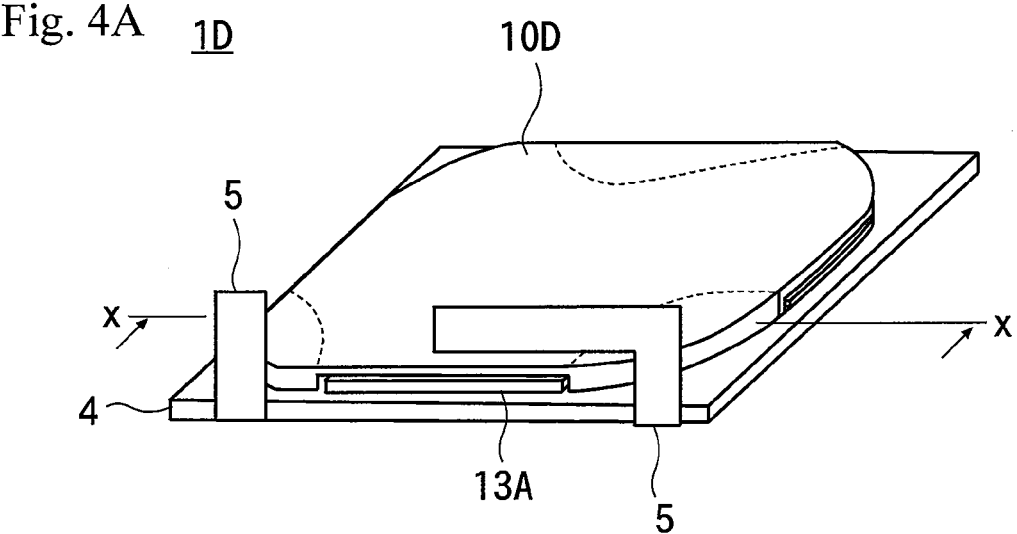
FIG. 4A is a perspective view of a battery pack in the vicinity of the wiring circuit board.
Figure 4B:
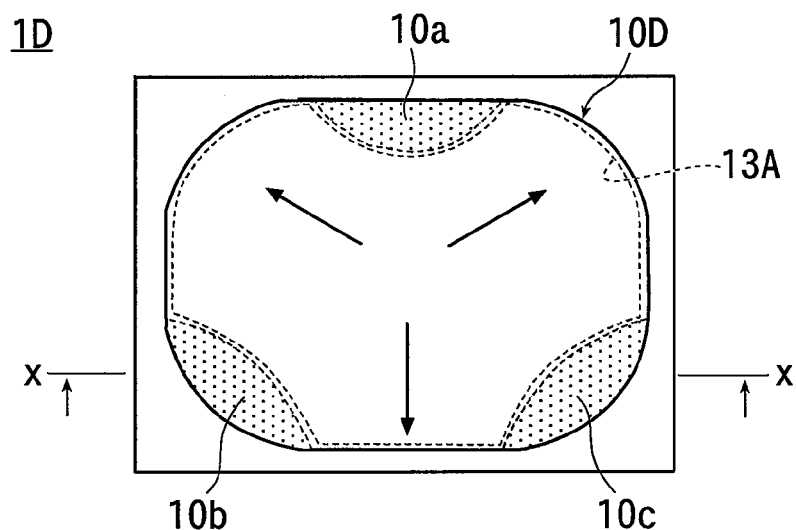
FIG. 4B is a plan view of the battery pack in the vicinity of the wiring circuit board.
Figure 4C:
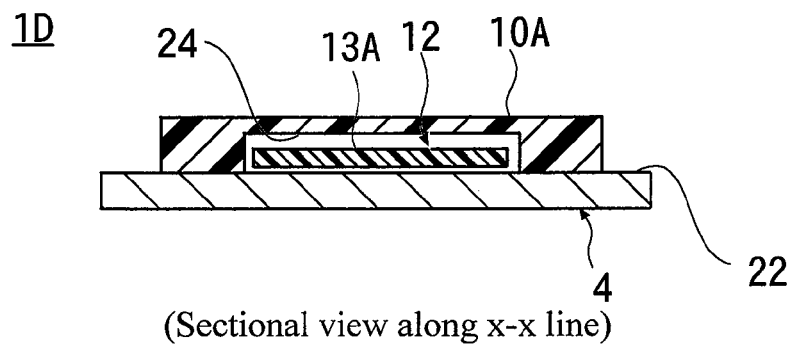
FIG. 4C is a sectional view along x-x line of the battery pack in the vicinity of the wiring circuit board.

FIG. 4A is a perspective view of a still another battery pack 1D in the vicinity of the wiring circuit board, FIG. 4B is a top view and FIG. 4C is a sectional view along x-x line in FIG. 4B. In this battery pack 1D, a retaining element 10D is fixed to a wiring circuit board 4 by adhesion in such a manner that the retaining element 10D surrounds a sheet-like or plate-like liquid-absorbing element 13A from its top and three peripheral sides and the liquid-absorbing element 13A is loosely inserted in a gap 12 between the back surface 24 of the retaining element 10D facing the wiring circuit board 4 and the top surface 22 of the wiring circuit board 4. Dotted regions 10a, 10b, 10c in FIG. 4B represent zones of the retaining element 10D adhered to the wiring circuit board 4.

When the liquid-absorbing element 13A absorbs liquid in this battery pack 1D, it also swells outward approximately along the plane of the sheet as shown in the arrows in FIG. 4B, but the location of the liquid-absorbing element 13A does not significantly get out the position in this battery pack 1D.

It should be noted that surrounding the periphery of the liquid-absorbing element 13A by the retaining element 10D from multiple directions in order to hold loosely the liquid-absorbing element 13 is not limited to three directions but also including four directions, for example.

Figure 5A:
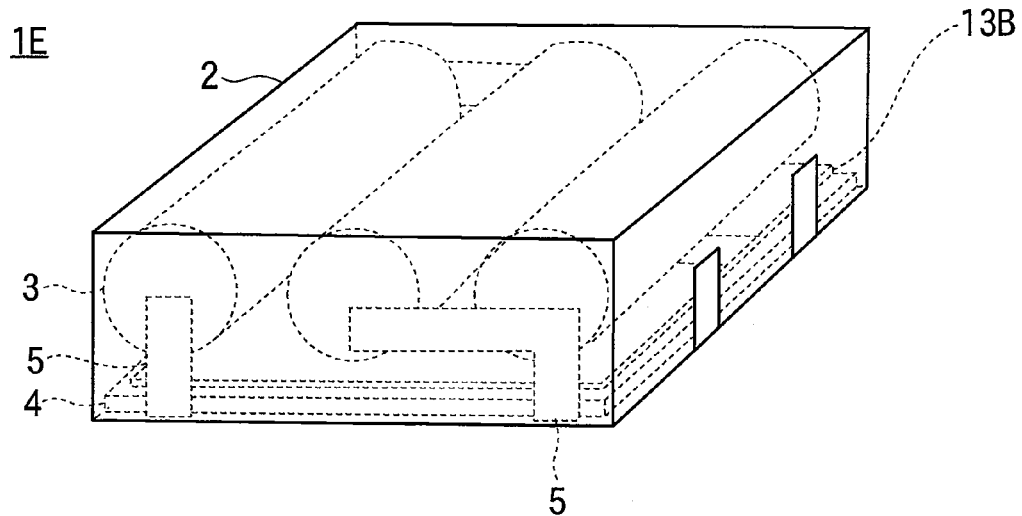
FIG. 5A is a perspective view of a battery pack.
Figure 5B:
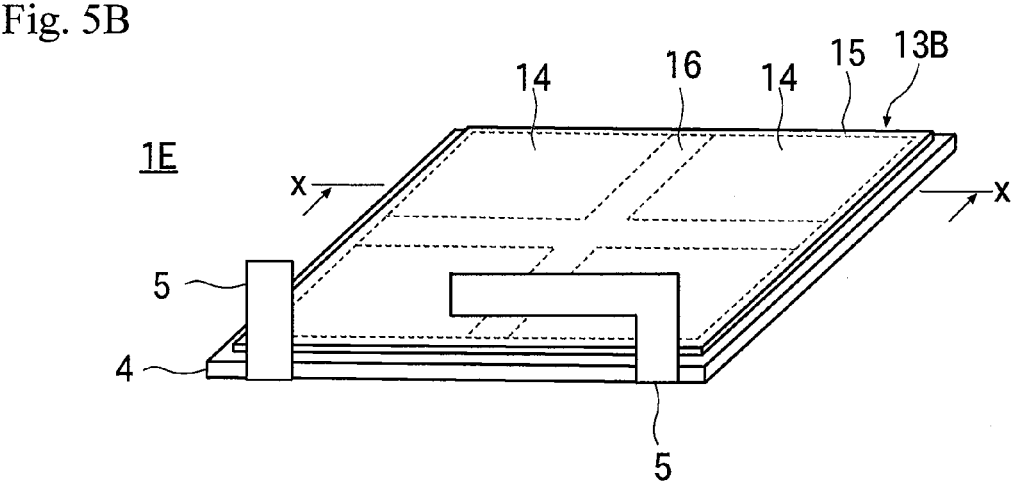
FIG. 5B is a perspective view of the battery pack in the vicinity of the wiring circuit board.
Figure 5C:
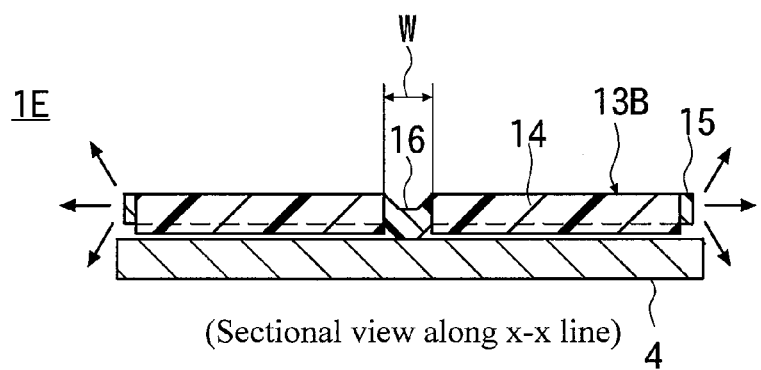
FIG. 5C is a sectional view along x-x line of the battery pack in the vicinity of the wiring circuit board.

FIG. 5A is a perspective view of a battery pack 1E according to an embodiment of the second aspect, FIG. 5B is a perspective view of the battery pack 1D in the vicinity of the wiring circuit board from which the battery case and the battery cells have been removed, and FIG. 5C is a sectional view along x-x line in FIG. 5B in the vicinity of the wiring circuit board.

This battery pack 1E also comprises a battery case 2 containing therein battery cells 3, a wiring circuit board 4, and a liquid-absorbing element 13B capable of absorbing the electrolyte leaking out from the battery cells 3. This liquid-absorbing element 13B consists of a non-absorbent porous retaining element 15a partially carrying a liquid absorbent along its plane to form a plurality of liquid absorbent parts 14 spaced from each other at a predetermined distance and an absorbent-free zone 16 of the porous retaining element 15 is fixed to the wiring circuit board 4 with an adhesive.

The liquid absorbent used here in the liquid absorbent parts 14 can be similar to the liquid absorbents constituting the liquid-absorbing elements 13A described above, and a non-woven fabric, porous plastic, and the like can be used as the porous retaining element 15.

In an embodiment, the distance between the liquid absorbent parts 14, e.g., the width w of the absorbent-free zone 16 can be determined depending on the total thickness of the porous retaining element 15 and the liquid absorbent parts 14 and other factors. It is normally equal to or greater than the total thickness, more specifically it is preferably 3 to 20 mm.

As shown in FIG. 5B, four liquid absorbent parts 14 separated by an elongate cross-shaped absorbent-free zone 16 are formed in this example.

Even if the electrolyte leaks out from a battery cell 3 and the liquid absorbent part 14 of the liquid-absorbing element 13B absorbs it during the use of this battery pack 1E, the liquid absorbent part 14 carried by the porous retaining element 15 swells outward approximately along the plane of the sheet as shown in the arrows but the swelling force has little influence on the absorbent-free zone 16 of the porous retaining element 15 so that the porous retaining element 15 keeps the state in which it is stably fixed to the wiring circuit board 4.

Figure 6:
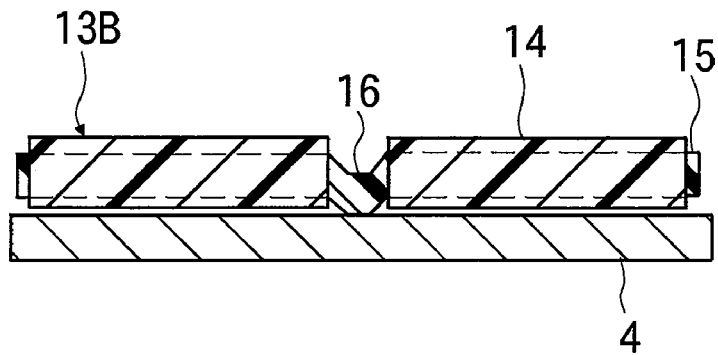
FIG. 6 is a sectional view of a battery pack in the vicinity of the wiring circuit board.

FIG. 6 is a sectional view of a variant of the battery pack 1E described above in the vicinity of the wiring circuit board. In this battery pack 1F, an absorbent-free zone 16 is provided along the plane of the porous retaining element 15 and liquid absorbent parts 14 held a liquid absorbent in such a manner that the liquid absorbent is raised from both of the top and bottom of the porous retaining element 15. Even when the liquid absorbent is held in this manner, the porous retaining element 15 can be stably fixed to the wiring circuit board 4 because of the presence of the absorbent-free zone 16.

Figure 7:
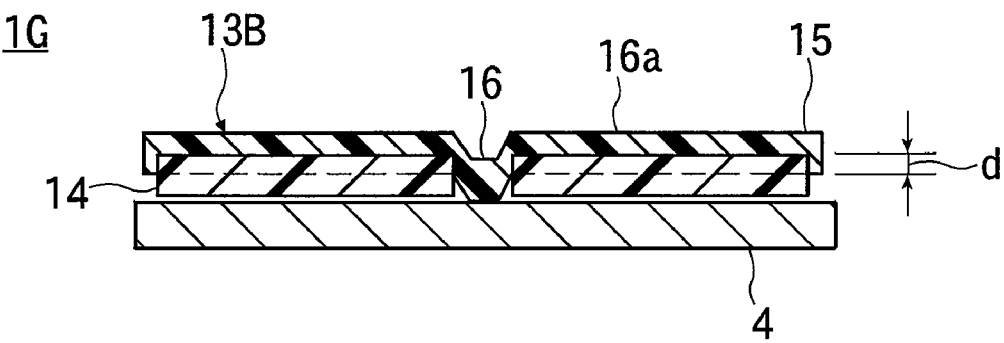
FIG. 7 is a sectional view of a battery pack in the vicinity of the wiring circuit board.

FIG. 7 shows a sectional view of another variant of the battery pack 1E described above in the vicinity of the wiring circuit board. In this battery pack 1G including a porous retaining element 15 partially holding a liquid absorbent to form liquid absorbent parts 14, an absorbent-free zone 16a is provided along not only the plane but also the thickness of the porous retaining element 15 so that it comes into plane-to-plane contact with the liquid absorbent parts 14. When the absorbent-free zone 16a is also provided along the thickness in this manner, the electrolyte is further absorbed from the absorbent-free zone 16a in which the porous retaining element 15 is exposed. In this case, the overlap thickness d of the porous retaining element 15 and the liquid absorbent parts 14 in the thickness direction is preferably e.g., 10 μm or more in terms of the bond strength of both.

Figure 8:
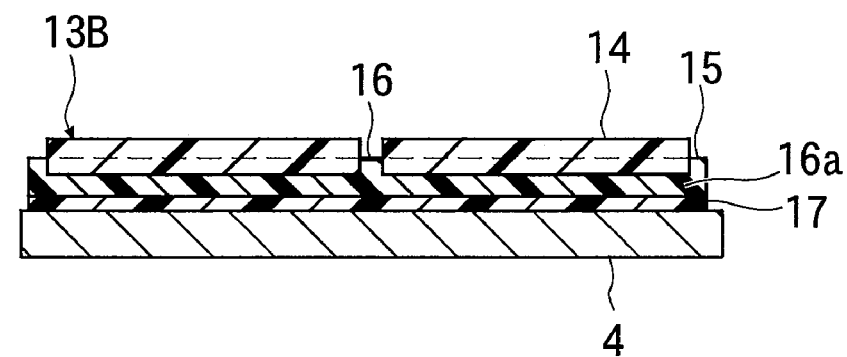
FIG. 8 is a sectional view of a battery pack in the vicinity of the wiring circuit board.

FIG. 8 shows a variant having liquid absorbent parts 14 holding a liquid absorbent to form an absorbent-free zone 16a along the thickness of a porous retaining element 15 wherein the surface of the absorbent-free zone 16a and the wiring circuit board 4 are fixed with an adhesive 17.

When the porous retaining element 15 is fixed with the adhesive 17 via the absorbent-free zone 16a formed along the thickness of the porous retaining element 15 as in the case of this battery pack 1H, the porous retaining element 15 can be more securely fixed as compared with the case where the absorbent-carrying zones are fixed to the wiring circuit board 4 with the adhesive 17.

Figure 9A:
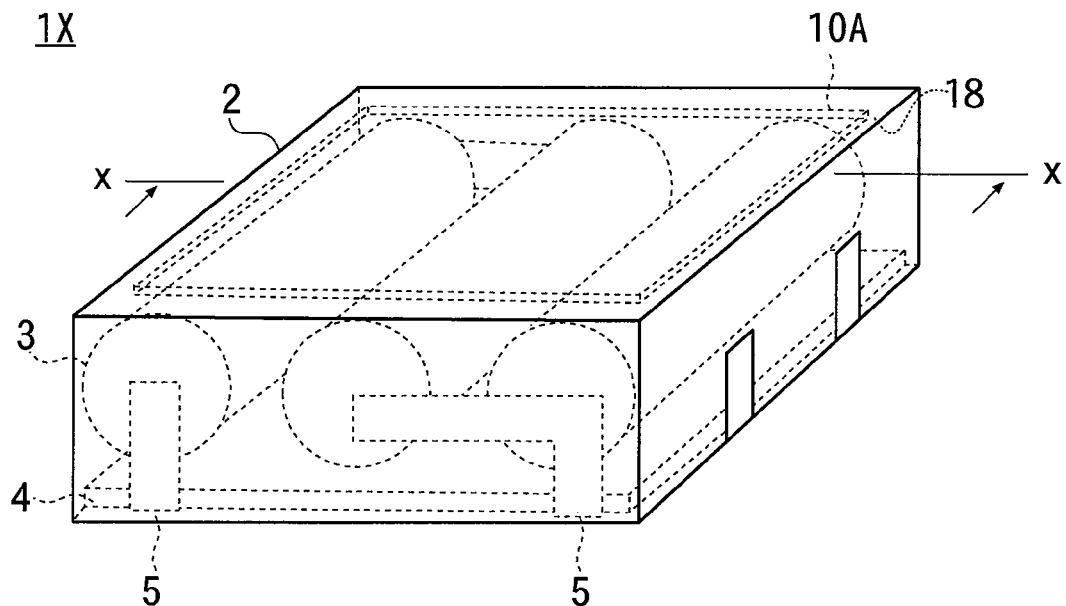
FIG. 9A is a perspective view of a battery pack.
Figure 9B:
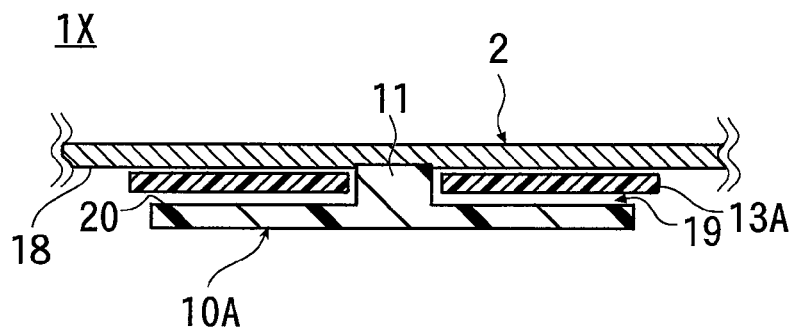
FIG. 9B is a sectional view along x-x line of the battery pack in the vicinity of the inner wall surface of the battery case.

FIG. 9A is a perspective view of a battery pack 1X according to another embodiment, and FIG. 9B is a sectional view along x-x line in FIG. 9A in the vicinity of the inner wall surface of the battery case.

In this embodiment which uses the same reference numerals to denote common elements to those of the foregoing embodiments and omit detailed explanation thereof, a retaining element 10A as described above is provided on an inner wall surface 18 of the inner wall of a battery case 2 of the battery pack 1X facing a wiring circuit board 4, as shown in FIGS. 9A and 9B, for example.

In this case, the retaining element 10A is fixed to the inner wall surface 18 of the battery case 2 via a projecting center support 11. This fixation is accomplished by fitting, bonding with an adhesive or the like, and may be detachable.

By fixing the retaining element 10A to the inner wall surface 18 of the battery case 2, a gap 19 is formed between the top surface 20 of the retaining element 10A facing the inner wall surface 18 and the inner wall surface 18, and a liquid-absorbing element 13A is inserted in this gap 19 with looseness allowing for expansion.

When the electrolyte leaks out from a battery cell 3 and the liquid-absorbing element 13A absorbs it during the use of this battery pack 1X, the liquid-absorbing element 13A also expands but its location does not significantly get out of position. Thus, the liquid-absorbing element 13A swollen by liquid absorption can be prevented from moving to an undesirable position with respect to the battery cells 3.

The other structures and advantages are identical with those of the foregoing embodiments and will not be further explained.

It should be understood that the present invention is not limited to the foregoing embodiments, but various modifications can be made.

For example, the subject matter of the present application is not limited to the foregoing embodiments in which the gap 12 or the gap 19 is provided by fixing the retaining element 10A to either one of the top surface 22 of the wiring circuit board 4 or the inner wall surface 18 of the battery case 2, but the gap 12 and the gap 19 may also be provided by fixing the retaining element 10A on both of the wiring circuit board 4 and the inner wall surface 18 of the battery case 2 and the liquid-absorbing element 13A may be inserted in these the gap 12 and gap 19 with looseness allowing for expansion.

The retaining element 10B can also be fixed on the inner wall surface 18 of the battery case 2 or both of the wiring circuit board 4 and the inner wall surface 18 of the battery case 2.

The subject matter of the present application is useful as a battery pack having an element capable of absorbing the electrolyte leaking out from a battery cell.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery pack comprising a battery case containing therein a battery cell, a wiring circuit board, and a liquid-absorbing element capable of absorbing an electrolyte leaking out from the battery cell, the battery pack further comprises a retaining element made of a material incapable of absorbing the electrolyte for retaining the liquid-absorbing element; and, wherein the liquid-absorbing element is inserted with looseness allowing for expansion in a gap formed by the retaining element on an attaching part in the battery case.

2. The battery pack according to claim 1 wherein the attaching part is the wiring circuit board and the liquid-absorbing clement is inserted with looseness allowing for expansion in a gap formed by the retaining element on the wiring circuit board.

3. The battery pack according to claim 1 wherein the attaching part is an inner wall of the battery case and the liquid-absorbing element is inserted with looseness allowing for expansion in a gap formed by the retaining element on the inner wall of the battery case.

4. The battery pack according to claim 1 wherein the attaching part is the wiring circuit board and the inner wall of the battery case and the liquid-absorbing elements are inserted with looseness allowing for expansion in gaps formed by the retaining element on the wiring circuit board and the retaining element on the inner wall of the battery case.

5. The battery pack according to claim 1 wherein the retaining element is a plate-shaped element or a sheet-shaped element and partially adhered to the attaching part.

6. The battery pack according to claim 1 wherein the liquid-absorbing element is inserted with looseness allowing for expansion without being bonded to the attaching part.

7. The battery pack according to claim 1 wherein the liquid-absorbing element is inserted with looseness allowing for expansion by inserting a support formed of a part of the retaining element into a hollow formed at the center of the liquid-absorbing element.

8. The battery pack according to claim 1 wherein the liquid-absorbing element is retained by surrounding the periphery of the liquid-absorbing element by the retaining element from at least three directions.

* * * * *